(12) United States Patent
Moore

(10) Patent No.: US 12,734,850 B2
(45) Date of Patent: Sep. 15, 2026

(54) TIRE VALVE

(71) Applicant: THE LEGION ENGINEERING CORPORATION, Changhua City (TW)

(72) Inventor: Wayne-Ian Moore, Worcestershire (GB)

(73) Assignee: THE LEGION ENGINEERING CORPORATION, Changhua City (TW)

( * ) Notice: Subject to any disclaimer, the term of this patent is extended or adjusted under 35 U.S.C. 154(b) by 4 days.

(21) Appl. No.: 18/952,094

(22) Filed: Nov. 19, 2024

(65) Prior Publication Data

US 2026/0138402 A1 May 21, 2026

(51) Int. Cl.
*B60C 29/02* (2006.01)
*B60C 29/00* (2006.01)

(52) U.S. Cl.
CPC ............ *B60C 29/02* (2013.01); *B60C 29/005* (2013.01)

(58) Field of Classification Search
CPC .............................. B60C 29/02; B60C 29/005
See application file for complete search history.

(56) References Cited

U.S. PATENT DOCUMENTS 3,280,879 A * 10/1966 Simms .................... B60C 29/02 152/427
4,718,639 A * 1/1988 Sherwood ............... B60C 29/00 251/366
4,739,813 A * 4/1988 Pagani .................... F16K 15/20 152/427
7,066,442 B2 * 6/2006 Rose ....................... F16K 15/20 251/149.8
7,766,039 B2 * 8/2010 Zuck ....................... F16L 37/32 137/614.04
2005/0087229 A1 * 4/2005 Uleski ................. B60C 23/0408 137/223
2007/0204946 A1 * 9/2007 Medley ................... B60B 25/20 152/427
2020/0331311 A1 * 10/2020 Courtney ............. B60C 29/005

* cited by examiner

*Primary Examiner* — Patrick C Williams
(74) *Attorney, Agent, or Firm* — MUNCY, GEISSLER, OLDS & LOWE, P.C.

(57) ABSTRACT

A tire valve is provided, wherein the tire valve includes: a tubular member including an inner surface, an internal channel and a first threaded portion, the internal channel being defined by the inner surface; a valve assembly including a sealing portion, movably inserted in the internal channel, and being operable to drive the sealing portion to engage with the inner surface to block the internal channel or disengage from the inner surface to unblock the internal channel; and a sleeve member including a connection opening and a second threaded portion, the second threaded portion being screwed to the first threaded portion, the sleeve member being configured to urge and secure the tire valve to a rim, the connection opening being in communication with the internal channel and configured for an inflation and deflation device to be detachably assembled thereto.

10 Claims, 8 Drawing Sheets

TIRE VALVE

BACKGROUND OF THE INVENTION

Field of the Invention

The present invention relates to a device for inflation/deflation, particularly to a tire valve.

Description of the Prior Art

A tire valve is installed on the rim and protrudes from the rim for inflation or deflation. Conventional tire valves mainly include a valve stem installed in a valve seat, and a valve pin is disposed within the valve stem to control the passage or blockage of air, thereby maintaining a required tire pressure.

A valve stem of a conventional tire valve includes an enlarged section which is designed to provide a larger air passage between a valve assembly and the enlarged section to achieve greater air flow. However, when a conventional tire valve is installed on a rim, the enlarged section of the valve stem is disposed through and beyond the rim. Additionally, a portion of the valve stem protruding from the rim needs to be secured by a nut and also needs to include a section for connection to an inflating device. As a result, the conventional valve stem have a significant axial dimension, which greatly increases the overall length of the conventional tire valve, making it prone to damage and breakage under external forces.

The present invention is, therefore, arisen to obviate or at least mitigate the above-mentioned disadvantages.

SUMMARY OF THE INVENTION

The main object of the present invention is to provide a tire valve which has a short length and reduces the risk of damage and breakage due to external forces.

To achieve the above and other objects, a tire valve is provided, wherein the tire valve includes: a tubular member including an inner surface, an internal channel and a first threaded portion, the internal channel being defined by the inner surface; a valve assembly including a sealing portion, movably inserted in the internal channel, and being operable to drive the sealing portion to engage with the inner surface to block the internal channel or disengage from the inner surface to unblock the internal channel; and a sleeve member including a connection opening and a second threaded portion, the second threaded portion being screwed to the first threaded portion, the sleeve member being configured to urge and secure the tire valve to a rim, the connection opening being in communication with the internal channel and configured for an inflation and deflation device to be detachably assembled thereto.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
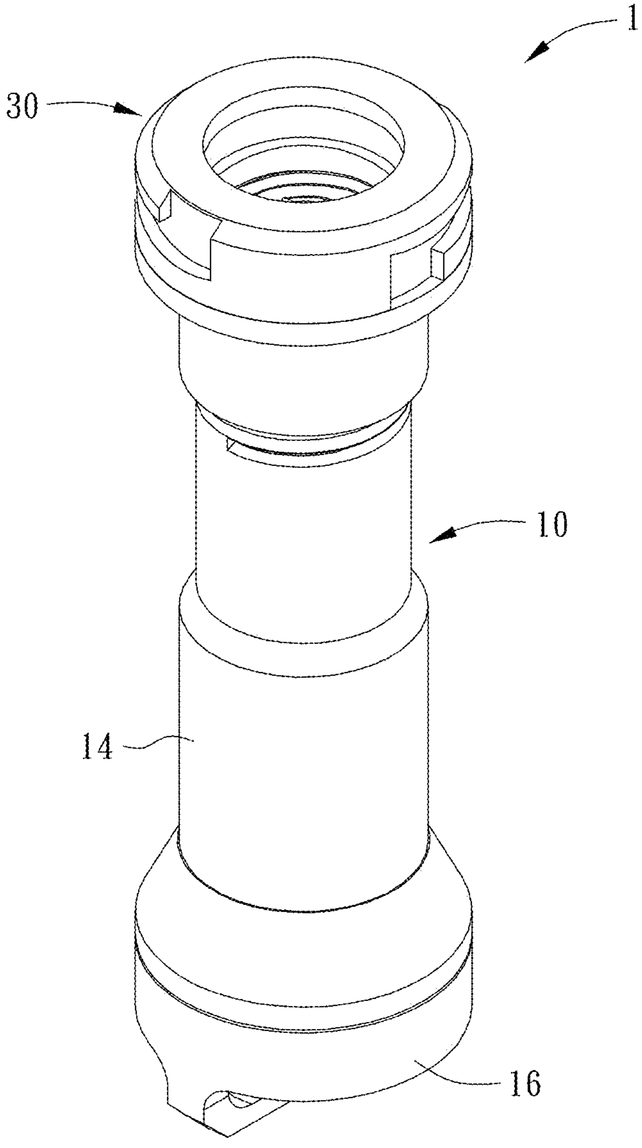
FIG. 1 is a perspective view of an exemplary embodiment of the present invention.
Figure 2:
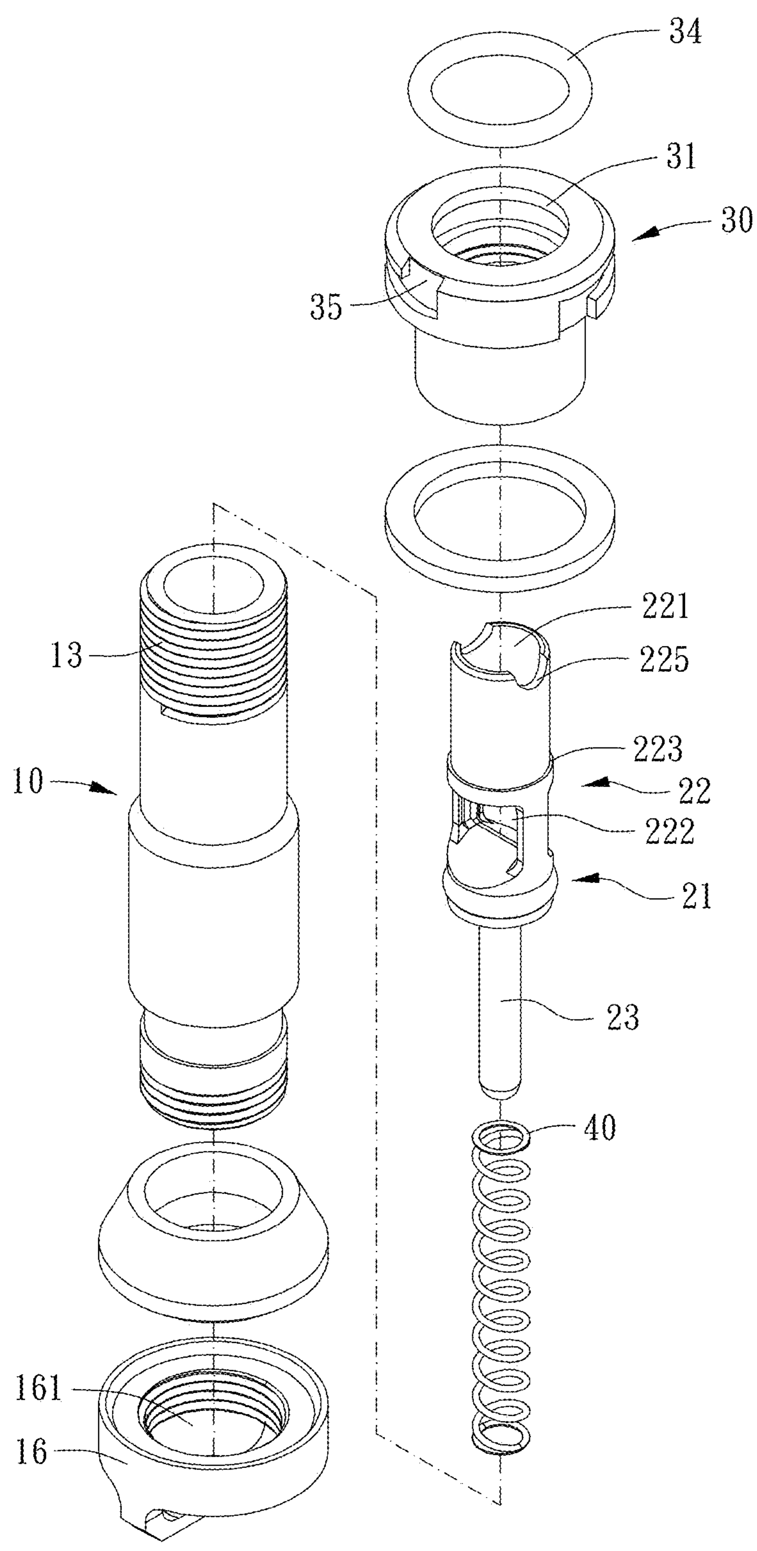
FIG. 2 is an exploded view of an exemplary embodiment of the present invention.
Figure 3:
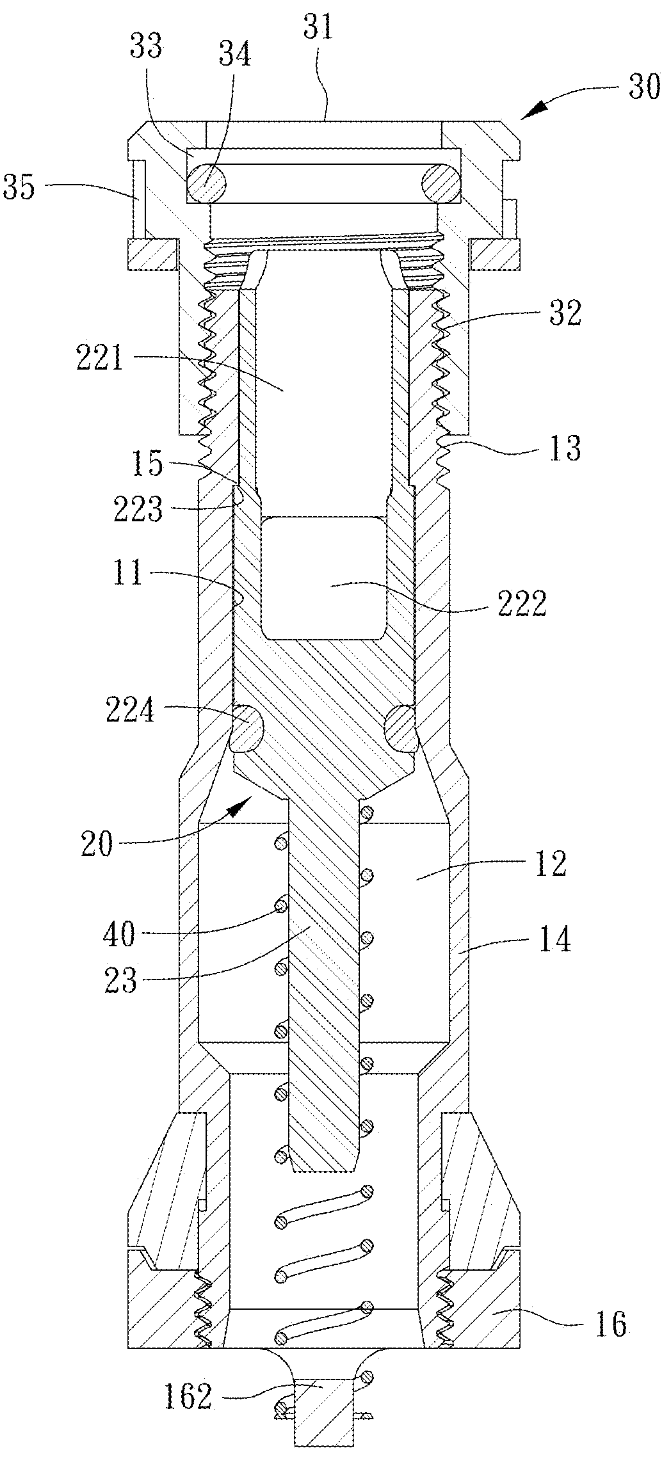
FIG. 3 is a cross-sectional view of an exemplary embodiment of the present invention.
Figure 4:
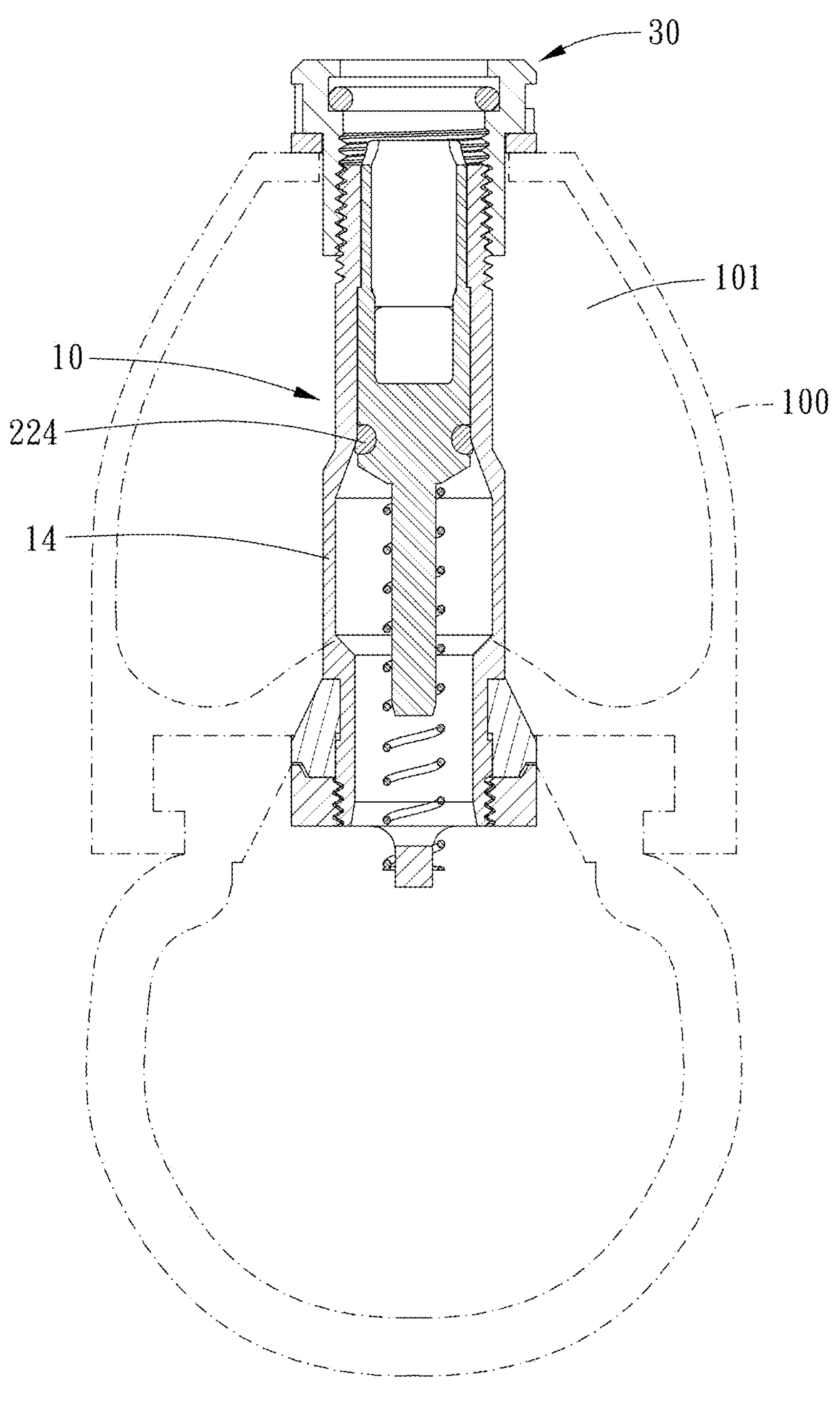
FIG. 4 is a schematic view showing a tire valve assembled to a rim according to an exemplary embodiment of the present invention.

Please refer to FIGS. 1 to 4 for an exemplary embodiment of the present invention. A tire valve 1 of the present invention includes a tubular member 10 and a valve assembly 20. The tire valve 1 may be a Schrader valve, Presta valve, or English valve. The tubular member 10 may be integrally formed of one piece or a multi-piece assembly. In a possible embodiment, the tubular member may include a valve body and a valve stem, the valve body and the valve stem may be integrally formed of one piece, wherein the valve body is configured to be connected to a rim, and the valve stem is connected to the valve body and extends outward beyond the rim.

The tubular member 10 includes an inner surface 11, an internal channel 12 and a first threaded portion 13, and the internal channel 12 is defined by the inner surface 11. The valve assembly 20 includes a sealing portion 21, and the valve assembly 20 is movably inserted in the internal channel 12. The valve assembly 20 is operable to drive the sealing portion 21 to engage with the inner surface 11 to block the internal channel 12 or to disengage from the inner surface 11 to unblock the internal channel 12. The sleeve member 30 includes a connection opening 31 and a second threaded portion 32. The second threaded portion 32 is screwed to the first threaded portion 13, and the sleeve member 30 is configured to directly or indirectly urge and secure the tire valve to a rim 100. The connection opening 31 is in communication with the internal channel 12 and configured for an inflation and deflation device to be detachably assembled thereto. Thus, the tubular member 10 either does not protrude or only slightly protrudes from the rim 100, significantly shortening the overall length of the tire valve and reducing the risk of damage from external forces.

The tubular member 10 further includes an enlarged section 14, and the internal channel 12 extends through the enlarged section 14, which provides a large airflow space between the enlarged section 14 and the valve assembly 20 to provide a higher flow rate. When the tubular member 10 is disposed through the rim 100, the enlarged section 14 is inserted in an internal room 101 of the rim 100, and a position where the sealing portion 21 engages with the inner surface 11 is located in the internal room 101 of the rim 100. This configuration eliminates the need for the enlarged section 14 to be positioned outside the rim 100 as in conventional tire valves, thereby significantly shortening the overall length of the tire valve and reducing the risk of damage from external forces.

The valve assembly 20 includes a valve pin 22, the valve pin 22 includes an axial hole 221 and at least one lateral hole 222 in communication with the axial hole 221, and the lateral hole 222 in communication with the internal channel 12. The tubular member 10 further includes a first shoulder 15 projecting from the inner surface 11. The valve pin 22 further includes a second shoulder 223, and the valve pin 22 is movable so that the second shoulder 223 is blocked by the first shoulder 15. When the second shoulder 223 is blocked by the first shoulder 15, the sealing portion 21 engages with the inner surface 11 to block the internal channel 12, ensuring that the sealing portion 21 securely engages with the inner surface 11. The sealing portion 21 may be a portion of the valve pin 22 or portion the valve pin 22. The valve assembly 20 may be stopped in such a manner that a portion of the valve pin 22 (such as an radially-enlarged flange under the additional sealing component installed on the valve pin 22) or the additional sealing component installed on the valve pin 22 is stopped on any portion of the inner surface 11 (such as a tapered surface of the enlarged section 14). Preferably, an end of the valve pin 22 facing the connection opening 31 includes at least one notch 225, and the at least one notch 225 is located within the sleeve member 30 to ensure that the axial hole 221 remains unblocked during deflation.

In this embodiment, an end cap 16 may be detachably connected to an end of the tubular member 10, facilitating easy installation and replacement. The end cap 16 includes at least one through hole 161 in communication with the internal channel 12, allowing for inflation and deflation operations. Preferably, the tire valve 1 further includes an elastic member 40 which resiliently biases the valve assembly 20 against the end cap 16 to ensure that the valve assembly 20 normally blocks the internal channel 12. Specifically, the elastic member 40 is a coil spring, and the valve assembly 20 further includes a shaft member 23 (e.g., a part of the valve pin 22). The end cap 16 includes a projection 162, and the elastic member 40 is sleeved on the shaft member 23 and the projection 162. Preferably, in an axial direction of the tubular member 10, the shaft member 23 has a length not less than a length of the enlarged section 14, thereby stabilizing the elastic member 40 and being conducive to stable operation of the valve assembly 20.

Preferably, an annular groove 33 is formed on an inner circumferential surface of the sleeve member 30. The annular groove 33 receives a sealing ring 34, and the sealing ring 34 is configured to sealingly engage with the inflation and deflation device (e.g., an air pump nozzle).

Figure 5:
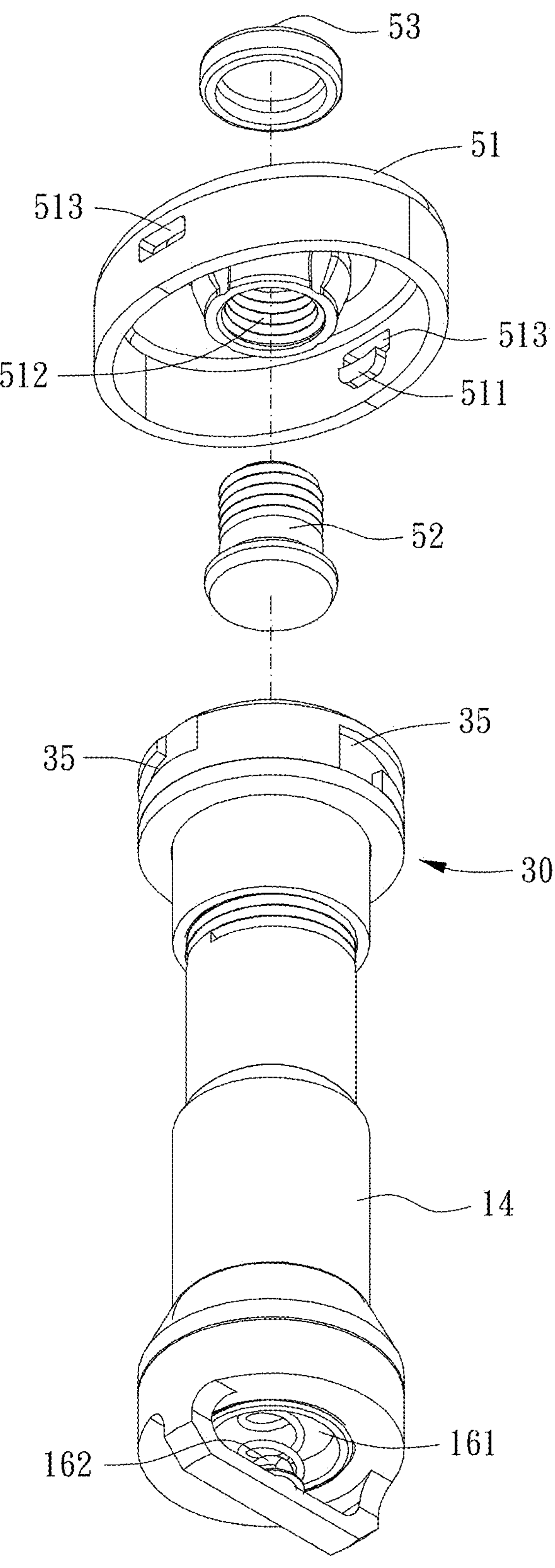
FIG. 5 is an exploded view of a tire valve including an exhaust cap assembly of an exemplary embodiment of the present invention.
Figure 6:
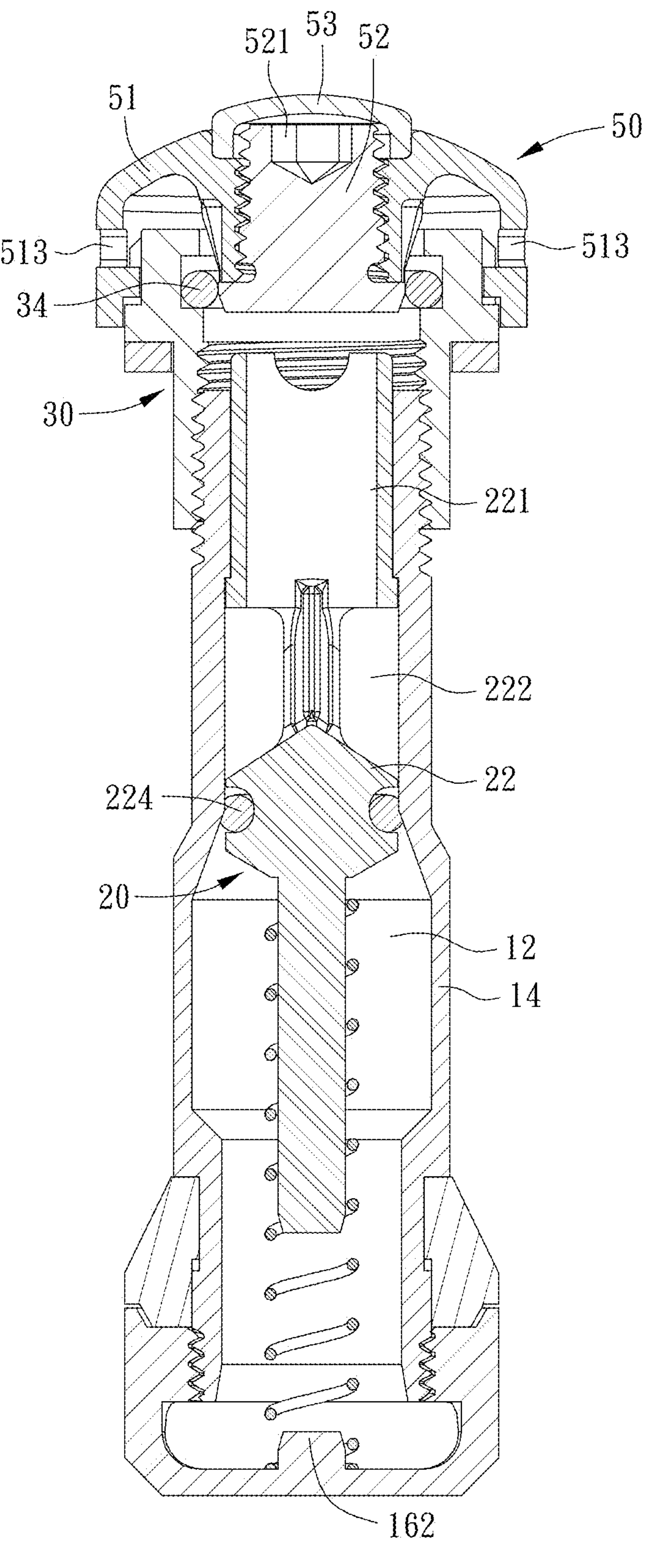
FIG. 6 is a cross-sectional view of the tire valve in FIG. 5.

Referring to FIGS. 5 and 6, the tire valve may further include an exhaust cap assembly 50. An outer circumferential surface of the sleeve member 30 includes at least one engaging slot 35. The exhaust cap assembly 50 includes a cap member 51 and a control member 52. The cap member 51 includes at least one engaging block 511, a perforation 512, and at least one gas passage 513 in communication with the perforation 512. The at least one engaging block 511 is detachably engaged in the at least one engaging slot 35 so that the cap member 51 covers the sleeve member 30. The control member 52 is adjustably screwed within the perforation 512 to block or unblock the communication between the internal channel 12 and the perforation 512, enabling deflation without removing the cap member 51. Specifically, the control member 52 is adjustable to sealingly engage with the sealing ring 34 to block the communication between the internal channel 12 and the perforation 512, or is adjustable to not sealingly engage with the sealing ring 34 to unblock the communication between the internal channel 12 and the perforation 512. Furthermore, the cap member 51 is oval-shaped so that in the major axis of the oval cap member 51 a gap is formed between the cap member 51 and the sleeve member 30 to facilitate deflation. A drive slot 521 is formed on an end surface of the control member 52 to allow a tool to engage with and rotate the control member 52. Additionally, a cover 53 may be disposed on the control member 52 to protect it and prevent foreign objects from entering.

Figure 7:
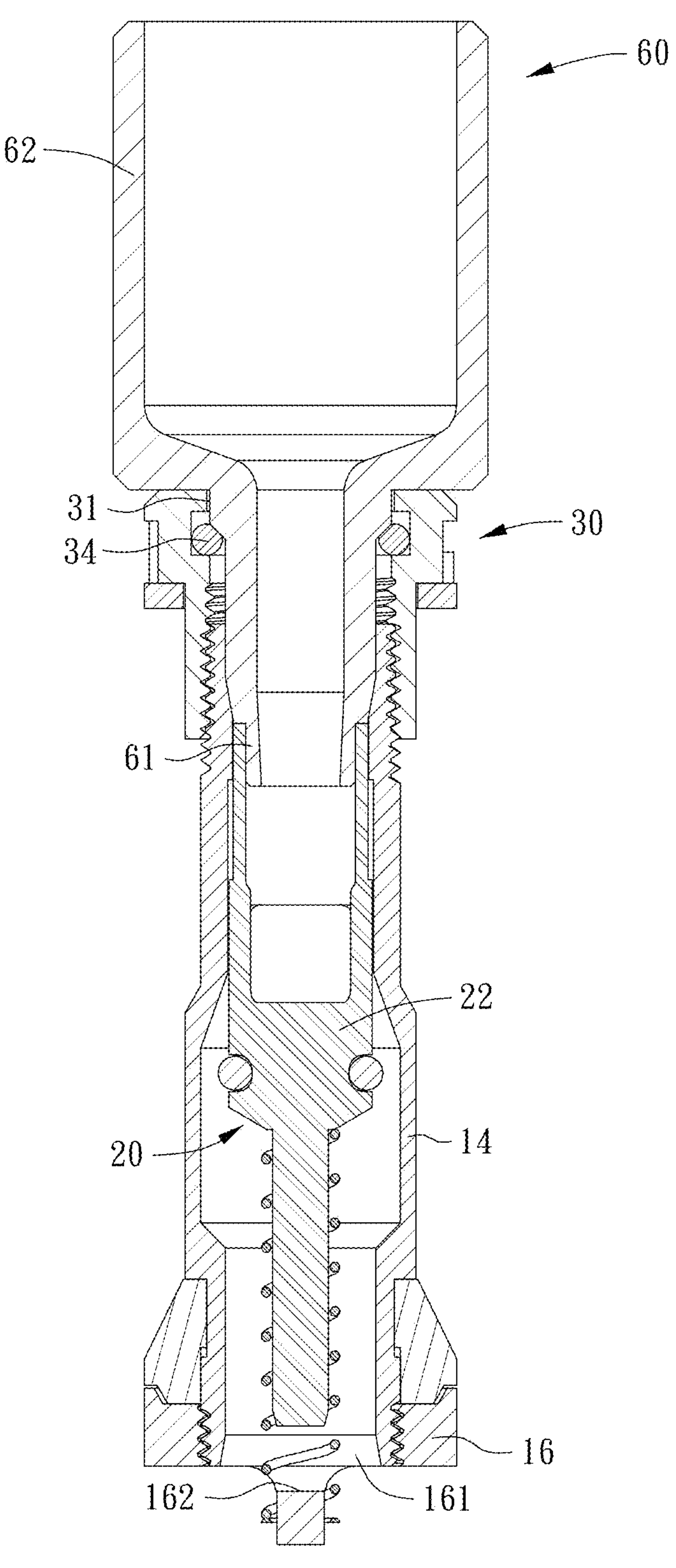
FIGS. 7 and 8 are cross-sectional views of tire valves each with a valve converter of an exemplary embodiment of the present invention.

Please refer to FIG. 7. The tire valve may further include a valve converter 60, wherein the valve converter 60 includes a small diameter portion 61 and a large diameter portion 62. The small diameter portion 61 is detachably inserted in the connection opening 31 and is sealingly engaged with the sealing ring 34. The large diameter portion 62 is located outside the sleeve member 30. The outer circumferential surface of the large diameter portion 62 is a smooth surface and configured to be assembled with an inflation and deflation device (such as an air pump nozzle). The small diameter portion 61 is further inserted in the valve assembly 20 (valve pin 22) and is in communication with the interior of the valve assembly 20, providing reliable engagement and airtight sealing.

Figure 8:
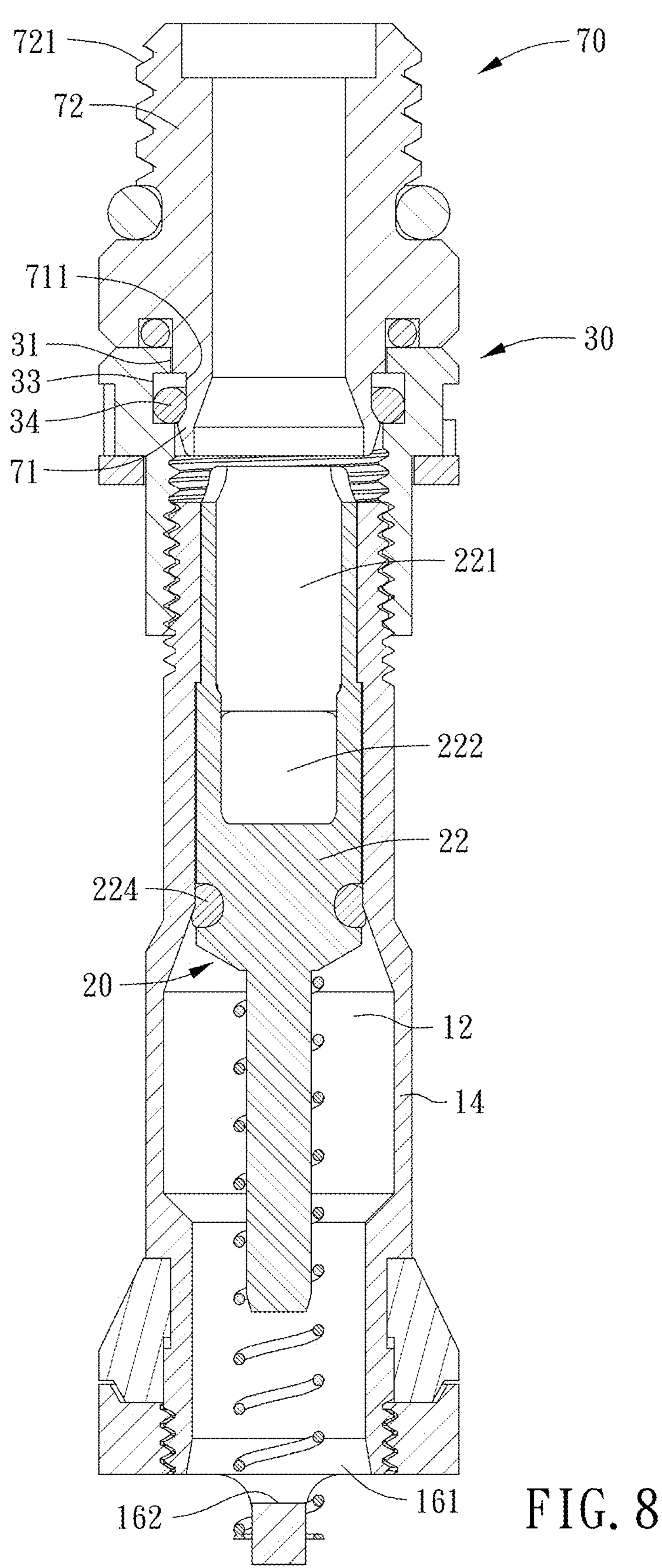

Please refer to FIG. 8, in this embodiment, the small diameter portion 71 of the valve converter 70 is not engaged with the valve assembly 20 (valve pin 22). An annular recess 711 is formed on an outer circumferential surface of the small diameter portion 71. The sealing ring 34 is sealingly engaged between the annular groove 33 and the annular recess 711, providing reliable engagement and airtight sealing. A threaded section 721 is formed on the outer circumferential surface of the large diameter portion 72, and the threaded section 721 is configured to be threadedly connected with an inflation and deflation device (such as an air pump nozzle).

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tire valve including:

a tubular member including an inner surface, an internal channel and a first threaded portion, the internal channel being defined by the inner surface;

a valve assembly including a sealing portion, movably inserted in the internal channel, and being operable to drive the sealing portion to engage with the inner surface to block the internal channel or disengage from the inner surface to unblock the internal channel; and a sleeve member including a connection opening and a second threaded portion, the second threaded portion being screwed to the first threaded portion, the sleeve member being configured to urge and secure the tire valve to a rim, the connection opening being in communication with the internal channel and configured for an inflation and deflation device to be detachably assembled thereto;

wherein an end portion of the tire valve opposite to the sleeve member has an outer diameter larger than an outer diameter of the second threaded portion of the sleeve member and is configured to be urged against a side of the rim opposite to the sleeve member.

2. The tire valve of claim 1, wherein an annular groove is formed on an inner circumferential surface of the sleeve member, the annular groove receives a sealing ring, and the sealing ring is configured to sealingly engage with the inflation and deflation device.

3. The tire valve of claim 2, further including an exhaust cap assembly, wherein an outer circumferential surface of the sleeve member includes at least one engaging slot, the exhaust cap assembly includes a cap member and a control member, the cap member includes at least one engaging block, a perforation and a gas passage in communication with the perforation, the at least one engaging block is detachably engaged in the at least one engaging slot so that the cap member covers the sleeve member, and the control member is adjustably screwed within the perforation to block or unblock the communication between the internal channel and the perforation.

4. The tire valve of claim 3, wherein the control member is adjustable to sealingly engage with the sealing ring to block the communication between the internal channel and the perforation or to disengage from the sealing ring to unblock the communication between the internal channel and the perforation.

5. The tire valve of claim 2, further including a valve converter, wherein the valve converter includes a small diameter portion and a large diameter portion, the small diameter portion is detachably inserted in the connection opening and sealingly engaged with the sealing ring, and the large diameter portion is located outside the sleeve member.

6. The tire valve of claim 5, wherein the small diameter portion is further engaged with the valve assembly and in communication with an interior of the valve assembly.

7. The tire valve of claim 5, wherein an annular recess is formed on an outer circumferential surface of the small diameter portion, the sealing ring is sealingly engaged between the annular groove and the annular recess, and a threaded section is formed on an outer circumferential surface of the large diameter portion.

8. The tire valve of claim 1, wherein the tubular member further includes an enlarged section, the internal channel extends through the enlarged section, when the tubular member is disposed through the rim, the enlarged section is inserted in an internal room of the rim, and a position where the sealing portion engages with the inner surface is located in the internal room of the rim.

9. The tire valve of claim 1, wherein the valve assembly further includes a valve pin, the valve pin includes an axial hole and at least one lateral hole in communication with the axial hole, the at least one lateral hole is in communication with the internal channel, the tubular member further includes a first shoulder projecting from the inner surface, the valve pin further includes a second shoulder, and the valve pin is movable so that the second shoulder is blocked by the first shoulder.

10. The tire valve of claim 9, wherein an end of the valve pin facing the connection opening includes at least one notch, and the at least one notch is located within the sleeve member.

* * * * *